United States Patent
Johnson et al.

(10) Patent No.: US 10,566,788 B2
(45) Date of Patent: Feb. 18, 2020

(54) SYSTEMS AND METHODS FOR REDUNDANT LINE VOLTAGE DROP COMPENSATION

(71) Applicant: ABB Schweiz AG, Baden (CH)

(72) Inventors: Mark Allen Johnson, Plano, TX (US); Brandon Michael Kamphaus, Wylie, TX (US); Edward Clark Fontana, Rockwell, TX (US)

(73) Assignee: ABB Schweiz AG, Baden (CH)

( * ) Notice: Subject to any disclaimer, the term of this patent is extended or adjusted under 35 U.S.C. 154(b) by 268 days.

(21) Appl. No.: 15/786,783

(22) Filed: Oct. 18, 2017

(65) Prior Publication Data
US 2018/0278054 A1    Sep. 27, 2018

Related U.S. Application Data

(60) Provisional application No. 62/476,346, filed on Mar. 24, 2017.

(51) Int. Cl.
| | |
|---|---|
| *H02J 1/02* | (2006.01) |
| *H02M 3/335* | (2006.01) |
| *G05F 5/00* | (2006.01) |
| *G05F 1/24* | (2006.01) |
| *H05K 5/02* | (2006.01) |

(52) U.S. Cl.
CPC ............... *H02J 1/02* (2013.01); *G05F 1/24* (2013.01); *G05F 5/00* (2013.01); *H02M 3/33507* (2013.01); *H05K 5/0213* (2013.01)

(58) Field of Classification Search
CPC ........ H02J 1/02; H02J 3/12; H02J 3/16; H02J 13/001; H02J 13/0013; G05F 5/00; G05F 1/24; H05K 5/0213; H02M 3/33507
See application file for complete search history.

(56) References Cited

U.S. PATENT DOCUMENTS

| | | | |
|---|---|---|---|
| 2,072,717 | A | 3/1937 | Marbury |
| 3,925,709 | A | 12/1975 | Mitchell et al. |
| 5,117,174 | A | 5/1992 | Kessler |
| 5,198,698 | A | 3/1993 | Paul et al. |
| 8,063,515 | B2 | 11/2011 | Larsen et al. |

(Continued)

FOREIGN PATENT DOCUMENTS

CN         104980041 A      10/2015

OTHER PUBLICATIONS

Leitermann et al., "Fast line drop compensation in low voltage regulators", CIRED Workshop, 2016, pp. 1-4. (Year: 2016).*

*Primary Examiner* — Jared Fureman
*Assistant Examiner* — Michael J Warmflash
(74) *Attorney, Agent, or Firm* — Barnes & Thornburg LLP (57) ABSTRACT

A redundant boost circuit configured to compensate for a voltage drop between a power supply and a plurality of loads is provided. The redundant boost circuit includes a first compensator module and a second compensator module. The first compensator module includes a first primary boost circuit and a first secondary boost circuit. The second compensator module includes a second primary boost circuit and a second secondary boost circuit. The first primary boost circuit and the second secondary boost circuit are electrically coupleable between the power supply and a first load. The second primary boost circuit and the first secondary boost circuit are electrically coupleable between the power supply and a second load.

20 Claims, 6 Drawing Sheets

(56) References Cited

U.S. PATENT DOCUMENTS

| | | |
|---|---|---|
| 9,252,671 B2 | 2/2016 | Klein |
| 10,374,421 B2* | 8/2019 | Johnson .................... G05F 1/24 |
| 10,374,422 B2* | 8/2019 | Rearick ................ H05K 5/0213 |
| 2018/0275700 A1* | 9/2018 | Rearick ..................... G05F 5/00 |
| 2018/0275711 A1* | 9/2018 | Johnson .................... G05F 5/00 |

* cited by examiner

SYSTEMS AND METHODS FOR REDUNDANT LINE VOLTAGE DROP COMPENSATION

CROSS REFERENCE TO RELATED APPLICATIONS

This application is a non-provisional application and claims priority to U.S. Provisional Patent Application Ser. No. 62/476,346 filed Mar. 24, 2017 for "SYSTEMS AND METHODS FOR LINE VOLTAGE DROP COMPENSATION", which is hereby incorporated by reference in its entirety.

BACKGROUND

The embodiments described herein relate generally to a boost circuit system for compensating for voltage drops in a power transmission system, and, more specifically, to a boost circuit system having redundant features for compensating for voltage drops in a power transmission system and methods of using the same.

Electrical power is transported using several methods in commercial and industrial systems. One of these methods includes using a conductive wire, referred to as a "line", to transfer power between a power supply and a load. A voltage drop is associated with transferring power through the line, and the transmission distance can be relatively large, resulting in a substantial drop in the voltage that is received at the load. That is, the line has a resistance sufficient to cause a noticeable voltage drop between the power supply and the load. The load may be a component, such as a radio, that requires a specific voltage to function and that will be damaged or become inoperable if power having the correct voltage is not provided.

At least some known power delivery systems incorporate boost circuit systems that compensate for a voltage drop resulting from transferring power between a power supply and a load through a transmission line. However, such systems may have downtime associated with maintenance or component failures of the boost circuit system. Performing routine maintenance on, or replacing a component of, a boost circuit system may require the boost circuit system to be shut down, inhibiting delivery of power to the load. Accordingly, an effective and efficient method for delivering power at a compensated voltage through a transmission line is needed.

BRIEF DESCRIPTION

In one aspect, a redundant boost circuit configured to compensate for a voltage drop between a power supply and a plurality of loads is provided. The redundant boost circuit includes a first compensator module and a second compensator module. The first compensator module includes a first primary boost circuit and a first secondary boost circuit. The second compensator module includes a second primary boost circuit and a second secondary boost circuit. The first primary boost circuit and the second secondary boost circuit are electrically coupleable between the power supply and a first load. The second primary boost circuit and the first secondary boost circuit are electrically coupleable between the power supply and a second load. The first and second compensator modules are communicatively coupled such that the second secondary boost circuit activates in the event that the first primary boost circuit is inoperable.

In another aspect, a line voltage drop compensation system is provided. The line voltage drop compensation system includes a power supply, a first load, a second load, and a redundant boost circuit configured to compensate for a voltage drop between the power supply and the first and second loads. The redundant boost circuit includes a first compensator module and a second compensator module. The first compensator module includes a first primary boost circuit and a first secondary boost circuit. The second compensator module includes a second primary boost circuit and a second secondary boost circuit. The first primary boost circuit and the second secondary boost circuit are electrically coupleable between the power supply and a first load. The second primary boost circuit and the first secondary boost circuit are electrically coupleable between the power supply and a second load. The first and second compensator modules are communicatively coupled such that the second secondary boost circuit activates in the event that the first primary boost circuit is inoperable.

In yet another aspect, a method of assembling a redundant boost circuit for compensating for a voltage drop between a power supply and a plurality of loads is provided. The method includes providing a first compensator module, wherein the first compensator module includes a first primary boost circuit and a first secondary boost circuit. The method also includes providing a second compensator module, wherein the second compensator module includes a second primary boost circuit and a second secondary boost circuit. The method further includes electrically coupling the first primary boost circuit in parallel with the second secondary boost circuit. The method includes electrically coupling the first secondary boost circuit in parallel with the second primary boost circuit.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. A value modified by the term "substantially similar", as used herein throughout the specification and claims, may be applied to modify any quantitative representation within a range of five percent of the referenced quantitative representation, and more particularly, within a range of one percent of the referenced quantitative representation. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments described herein facilitate improving the reliability of a boost circuit system configured to compensate for line voltage drop between a power supply and a load using a redundant boost circuit system. Specifically, the redundant boost circuit system includes a redundant boost circuit and a controller. The redundant boost circuit includes a first compensator module including a primary boost circuit and a second compensator module including a secondary boost circuit. The secondary boost circuit and the primary boost circuit are configured to compensate for a voltage drop between a power supply and a load. The controller is configured to generate at least one control signal to control an output voltage of the redundant boost circuit, to determine if the primary boost circuit is operable, and to transmit the at least one control signal to one of the primary boost circuit and the secondary boost circuit, wherein the at least one control signal is transmitted to the secondary boost circuit if the primary boost circuit is inoperable. The load is carried by the primary circuit during normal operation and is shifted to the secondary circuit if the first circuit requires maintenance or experiences a failure, either in the first component or the primary circuit itself. Such a configuration facilitates reducing operational downtime and increasing boost circuit system reliability, promoting superior performance, reduced operational costs, and more efficient maintenance of the boost circuit system.

Figure 1:
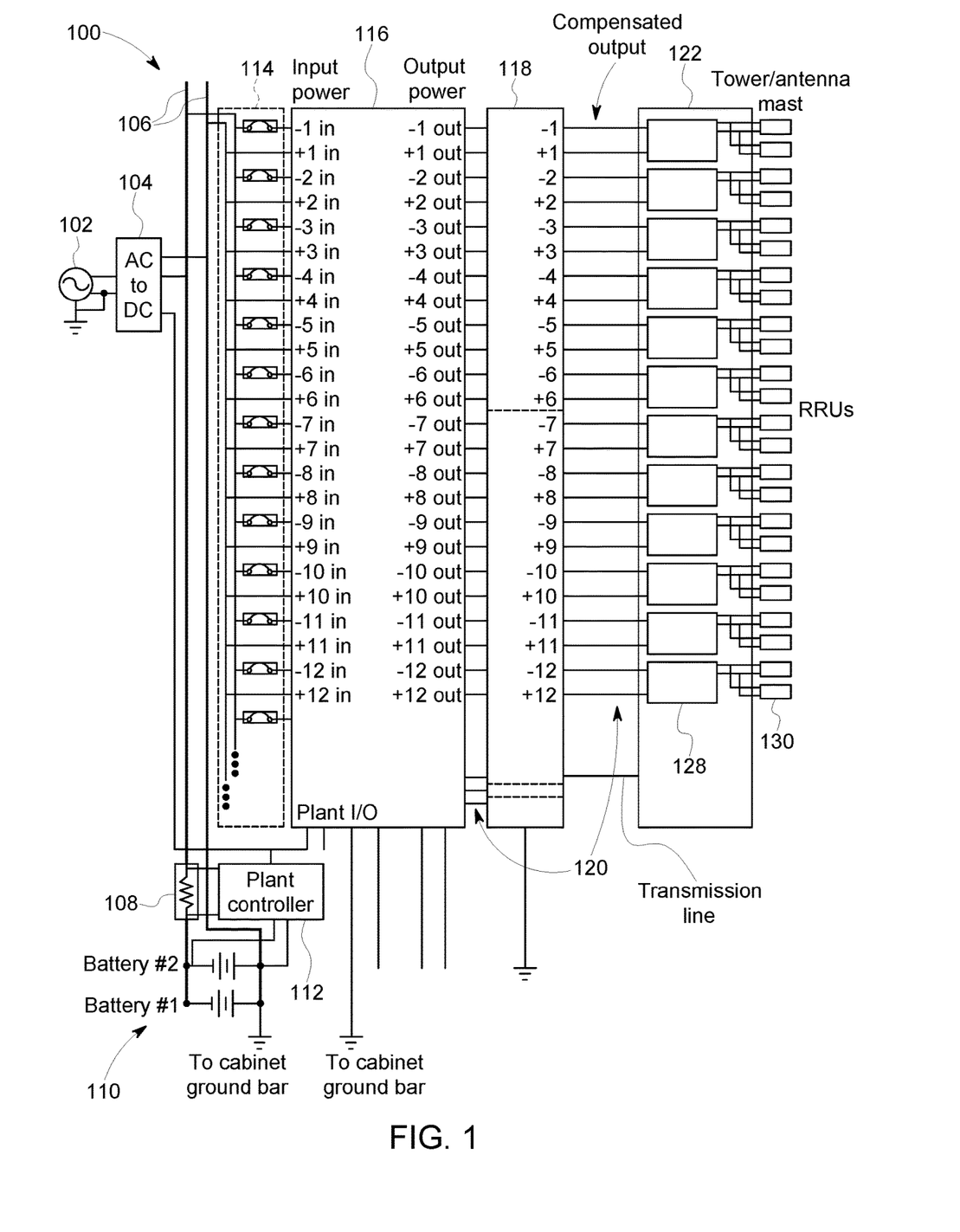
FIG. 1 is a schematic diagram of an exemplary radio system.

FIG. 1 is a schematic diagram of an exemplary radio system 100. Radio system 100 is used with a communication tower (not shown) to transmit and/or receive communication signals. In the example embodiment, radio system 100 is coupled to a utility source 102 (sometimes referred to as a "power supply") to receive power. More specifically, power from utility source 102 is converted from alternating current (AC) power to direct current (DC) power by converter 104 for use by radio system 100. In the example embodiment, radio system 100 includes a set of power supply lines 106, a shunt 108, a set of batteries 110, a plant or system controller 112, a plurality of circuit breakers 114, a redundant boost circuit system 116, a surge protector 118, a plurality of transmission lines 120, and a tower or tower mast assembly 122. In other embodiments, radio system 100 includes additional, fewer, or alternative components, including those described elsewhere herein.

Power supply lines 106 provide power from utility source 102 to various components of radio system 100. In the example embodiment, power supply lines 106 are coupled to converter 104, shunt 108, batteries 110, controller 112, and circuit breakers 114 to provide DC power. In other embodiments, power supply lines 106 may be configured to transmit AC power. In such embodiments, power supply lines 106 may be directly connected to utility source 102. In the exemplary embodiment, power supply line 106 includes a grounded power supply line and a 48 volt (V) DC power supply line.

Shunt 108 is coupled between power supply lines 106 and batteries 110 to facilitate monitoring of an electric current by controller 112. That is, controller 112 is coupled to the two terminals of shunt 108 to monitor a voltage drop across shunt 108. The resistance value of shunt 108 is known by controller 112, and therefore controller 112 calculates the current value based on the known resistance of shunt 108 and the measured voltage drop. In at least some embodiments, shunt 108 is configured to have a relatively small resistance such that the voltage drop across shunt 108 does not substantively affect the amount of power provided to batteries 110 or circuit breakers 114. Controller 112 is configured to operate components of radio system 100 as described herein based on the monitored current across shunt 108.

Batteries 110 are configured to store electrical energy to supplement power provided by utility source 102 and to power other components that do not receive power from power supply lines 106. In the example embodiment, radio system 100 includes two batteries 110. In other embodiments, radio system 100 includes a different number of batteries 110 (including one or zero). Additionally or alternatively, radio system 100 may include other power storage devices other than batteries 110 to provide power, such as capacitors.

Controller 112 is configured to monitor parameters of radio system 100 and operate radio system 100 based on the monitored parameters. For example, controller 112 monitors the current of power supply lines 106 via shunt 108 and controls converter 104 and/or redundant boost circuit system 116 to adjust their output to facilitate operation of radio system 100.

Circuit breakers 114 are coupled between power supply lines 106 and redundant boost circuit system 116. Circuit breakers 114 are configured to electrically disconnect the power supply lines 106 from redundant boost circuit system 116 and transmission lines 120 when an over-current condition (e.g., a short circuit) is detected to protect radio system 100 from potential damage.

Redundant boost circuit system 116 is a boost circuit configured to compensate for a voltage drop across transmission lines 120. That is, redundant boost circuit system 116 is configured to boost the voltage of the power supplied to tower mast assembly 122 to account for the voltage drop across transmission lines 120. In the exemplary embodiment, redundant boost circuit system 116 includes twelve channels for tower mast assembly 122. Each channel has a corresponding transmission line 120 and subassembly of tower mast assembly 122. As a result, each channel may have a unique line resistance and/or a unique current draw from tower mast assembly 122, thereby resulting in different voltage drops for each channel. Redundant boost circuit system 116 is configured to boost each channel separately to increase accuracy of the compensation for each channel. In at least some embodiments, redundant boost circuit system 116 may include a plurality of modules (not shown in FIG. 1) that are associated with a subset of the channels. In other embodiments, redundant boost circuit system 116 may include a different number of channels (including one). Although described herein for communication towers, it is to be understood that other systems may use redundant boost circuit system 116 for compensating for line-drop between a power supply and a load.

Redundant boost circuit system 116 is coupled to transmission lines 120 to provide power to tower mast assembly 122. In the exemplary embodiment, surge protector 118 is coupled to transmission lines 120 between redundant boost circuit system 116 and tower mast assembly 122. Surge protector 118 is configured to limit voltage spikes on transmission lines 120 to protect tower mast assembly 122 from potential damage. In some embodiments, converter 104, power supply lines 106, shunt 108, batteries 110, controller 112, circuit breakers 114, redundant boost circuit system 116, and/or surge protector 118 are located at a base of the tower. In one example, shunt 108, batteries 110, circuit breaker 114, redundant boost circuit system 116, and surge protector 118 are positioned within a cabinet or other enclosure that is accessible by an operator for maintenance. In other embodiments, converter 104, power supply lines 106, shunt 108, batteries 110, controller 112, circuit breakers 114, redundant boost circuit system 116, and/or surge protector 118 may be at a different location relative to the communication tower. Transmission lines 120 extend from redundant boost circuit system 116 near the base of the tower to tower mast assembly 122, which is location at or near the top of the tower. Transmission lines 120 have a gauge and a length that creates a substantive resistance, thereby generating a substantive voltage drop proportional to the current drawn by tower mast assembly 122.

In the exemplary embodiment, tower mast assembly 122 includes a plurality of voltage sensors 128 and a plurality of remote radio units (RRU) 130 (sometimes referred to as a "load"). RRUs 130 may sometimes be referred to herein as "radios 130" or "radio heads 130". Voltage sensors 128 are configured to monitor the voltage at or near RRUs 130. Voltage sensors 128 transmit the monitored voltage data to controller 112 and/or redundant boost circuit system 116 via wired or wireless communication to facilitate voltage compensation as described herein. In the exemplary embodiment, transmission lines 120 include one or more lines configured for data communication to transmit the monitored voltage data to redundant boost circuit system 116. In one example, the monitored voltage data is transmitted to the "R1" channel of redundant boost circuit system 116.

RRUs 130 are configured to receive and transmit communication signals. In the exemplary embodiment, RRUs 130 include an antenna to broadcast the signals and a capacitor to prevent instantaneous shut down of RRU 130. Each RRU 130 has a predetermined under-voltage (UV) threshold such that power from power supply lines 106 must be above the UV threshold to activate RRU 130. In alternative embodiments, RRUs 130 may be configured in any manner that facilitates operation of radio system 100 as described herein.

Figure 2:
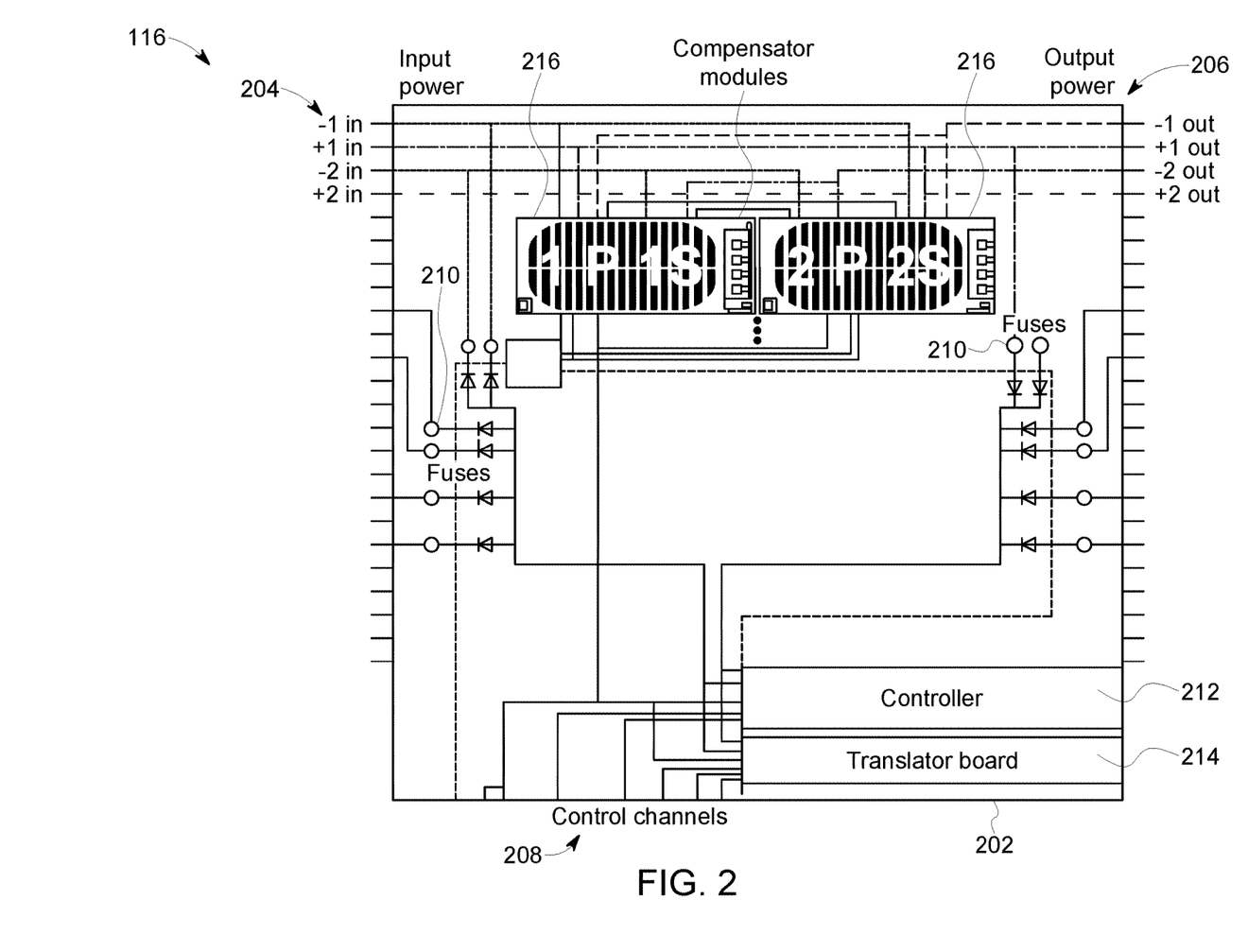
FIG. 2 is a schematic diagram of an exemplary redundant boost circuit system that may be used with the radio system shown in FIG. 1.

FIG. 2 is a schematic diagram of redundant boost circuit system 116 that may be used with radio system 100 (shown in FIG. 1). With respect to FIG. 2, redundant boost circuit system 116 includes a housing 202 having a plurality of input channels 204, a plurality of output channels 206, and a plurality of control channels 208. Input channels 204 receive power from a power supply (e.g., utility source 102 via power supply lines 106, shown in FIG. 1) and output channels 206 transmit power to one or more RRUs via a plurality of transmission lines. Each port of input channels 204 has a respective port of output channels 206. At least some input channels 204 and output channels 206 are coupled to one or more fuses 210 to prevent over-current conditions from damaging components coupled to the respective channel. Control channels 208 are configured to receive and/or transmit data (digital or otherwise) to and from a controller 212 and a translator board 214 of redundant boost circuit system 116. Controller 212 is configured to operate redundant boost circuit system 116 as described herein in response to data or command signals received. In at least some embodiments, translator board 214 is coupled to a control channel 208 (e.g., R1) for receiving monitored voltage data from a sensor at the top of the communication tower. Translator board 214 is configured to process the data for controller 212. Controller 212 uses the voltage data from translator board 214 and data from compensator modules 216 to adjust the operation of compensator modules 216 and compensate for the line voltage drop as described herein.

Redundant boost circuit system 116 further includes at least one compensator module 216. In the exemplary embodiment, redundant boost circuit system 116 includes twelve compensator modules 216, however only two compensator modules 216 are shown for clarity. In other embodiments, redundant boost circuit system 116 includes a different number of compensator modules 216. Compensator modules 216 are coupled between one or more input channels 204 and one or more output channels 206. Compensator modules 216 may also be coupled to control channels 208 and/or one or more controllers 212. Each compensator module 216 is configured to selectively boost a voltage of power provided by a respective input channel 204 and transmitting the boosted voltage to a transmission line via a respective output channel 206. Compensator module 216 includes any circuits, microprocessors, controllers, power supplies, and the like to facilitate boosting the voltage to a specific value based on a determined resistance of a transmission line as described herein. In certain embodiments, compensator modules 216 may be configured to generate a sinusoidal, oscillating, or other signal at output channels 206. In one example, compensator module 216 modulates the power received from input channels 204. In other embodiments, compensator module 216 may generate the signal using a separate power source (e.g., an internal power supply).

With respect to FIG. 1, communication towers, such as the towers used with radio system 100, may be operated without scheduled downtime (i.e., for maintenance) for an extended period of time. In addition, the towers may be configured to transmit and receive critical data and cannot be shut down for relatively long periods of time. For example, if a communication tower covers communication for a geographic region with limited coverage from other towers, shutting down the communication tower may prevent communication in that particular area. To increase the reliability of components within radio system 100, redundancy is implemented, as described herein. For example, FIG. 3 is a simplified block diagram of redundant boost circuit system 116 (shown in FIG. 2).

Figure 3:
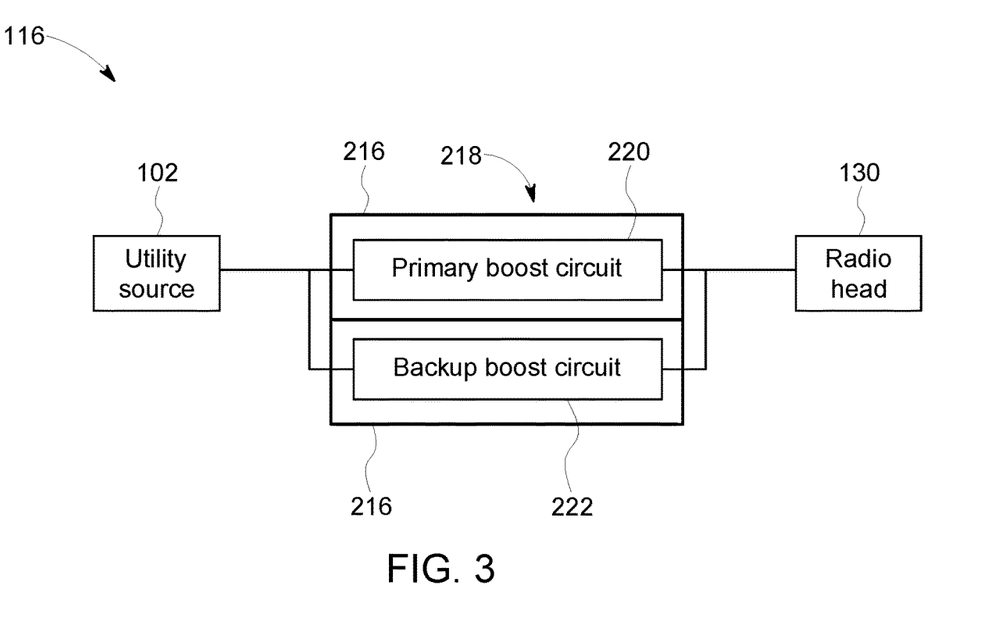
FIG. 3 is a simplified block diagram of the redundant boost circuit system shown in FIG. 2.

With respect to FIGS. 1 and 3, utility source 102 is configured to provide power for RRUs 130. Redundant boost circuits 218 correspond to redundant boost circuit system 116. More specifically, each redundant boost circuit 218 corresponds to a portion of a compensator module 216 (shown in FIG. 2) as described herein. Redundant boost circuits 218 include a primary boost circuit 220 and a secondary or backup boost circuit 222. In the exemplary embodiment, primary boost circuit 220 is configured to operate while secondary boost circuit 222 idles, remains shut down, or otherwise operates at a reduced capacity. In some embodiments, a droop control technique may be used to regulate the operation of secondary boost circuit 222. If primary boost circuit 220 fails, secondary boost circuit 222 is configured to carry a power load from utility source 102 to RRU 130 while primary boost circuit 220 is replaced, thereby avoiding potential downtime. In at least some embodiments, redundant boost circuits 218 are configured to generate a status signal that indicates whether or not each redundant boost circuit 218 is fully operational. In one example, primary boost circuit 220 generates a continuous or periodic status signal for receipt by secondary boost circuit 222. When the status signal is not received by secondary boost circuit 222, secondary boost circuit 222 may determine primary boost circuit 220 has failed. In such an example, secondary boost circuit 222 begins operating at full capacity after determining primary boost circuit 220 has failed. In other embodiments, redundant boost circuit system 116 may include additional redundant boost circuits, such as three redundant boost circuits 218.

Figure 4:
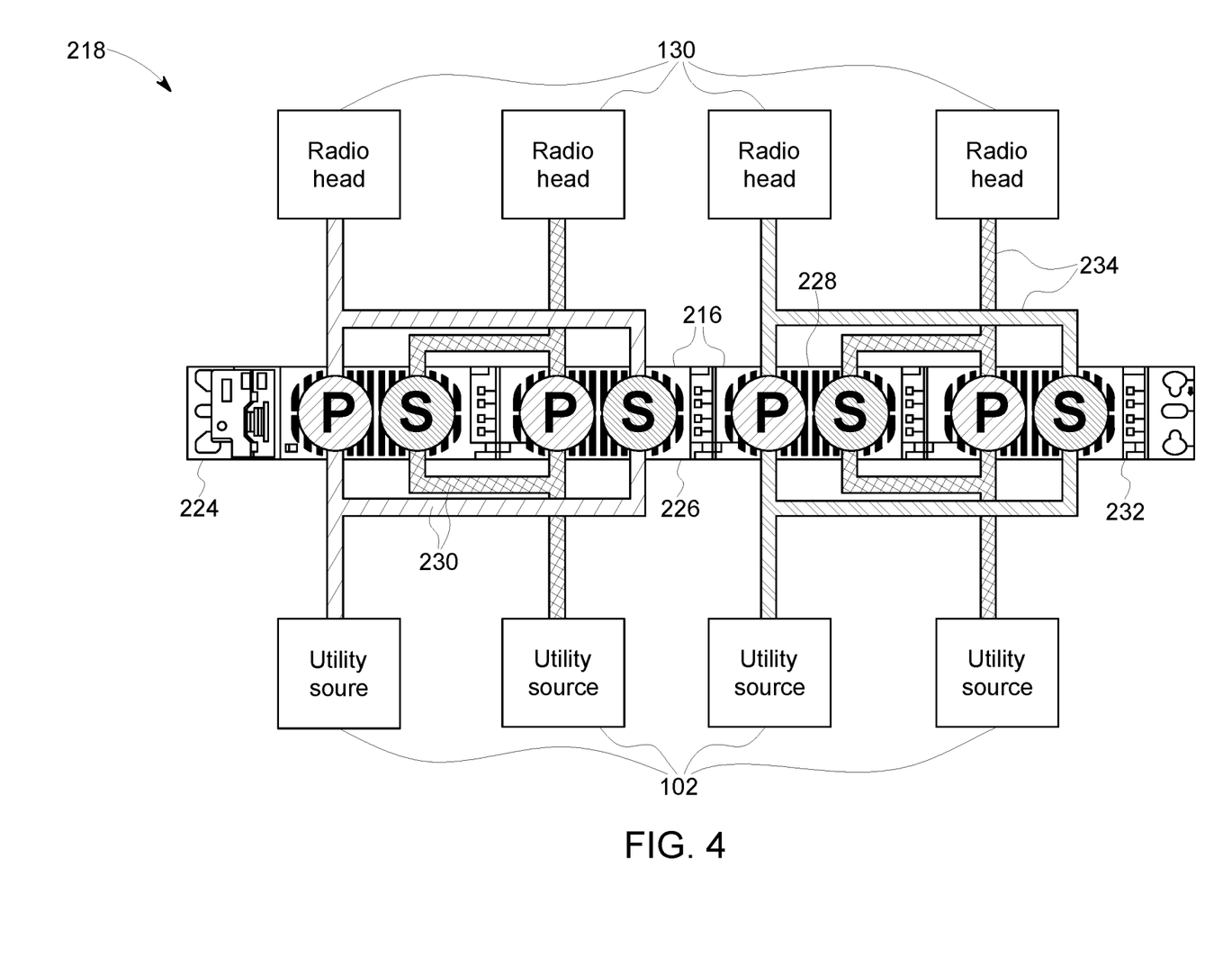
FIG. 4 is a schematic diagram of exemplary redundant boost circuits between exemplary compensator modules that may be used with the redundant boost circuit system shown in FIG. 2.

FIG. 4 is a schematic diagram of exemplary redundant boost circuits 218 between compensator modules 216 that may be used with redundant boost circuit system 116 (shown in FIG. 2). In the exemplary embodiment, a first compensator module 224 and a second compensator module 226 include redundant channels 230 for a first radio and a second radio. A third compensator module 228 and a fourth compensator module 232 include redundant channels 234 for a third radio and a fourth radio. Each compensator module 224, 226, 228, 232 has a primary boost circuit ("P") and a second boost circuit ("S") for different channels. That is, compensator modules 224, 226, 228, 232 include boost circuitry (e.g., transformers, diodes, switches, capacitors, etc.) for two separate channels.

In the exemplary embodiment, having boost circuits for different channels enables one compensator module to be replaced or repaired without significantly impacting any of the channels 230, 234. First compensator module 224 and second compensator module 226 are communicatively coupled such that secondary boost circuit 222 of second compensator module 226 activates in the event that primary boost circuit 220 of first compensator module 224 is inoperable. In one example, suppose the primary boost circuit for first radio fails. Accordingly, first compensator module 224 is replaced or repaired to address the failing primary boost circuit. Notably, first and second radios remain online when first compensator module 224 is removed, because first radio is supported by the secondary circuit in second compensator module 226 and second radio continues to be supported by the primary circuit in second compensator module 226. While first compensator module 224 is offline, first and second radios continue to operate using second compensator module 226. In alternative embodiments, without affecting functionality of first compensator module 224 and/or second compensator module 226, first compensator module 224 includes two primary boost circuits and second compensator module 226 includes two secondary boost circuits. In other embodiments, additional redundancy may be added, such as by adding additional compensator modules 216 and/or adding additional boost circuits 218 within each compensator module 216.

Figure 5:
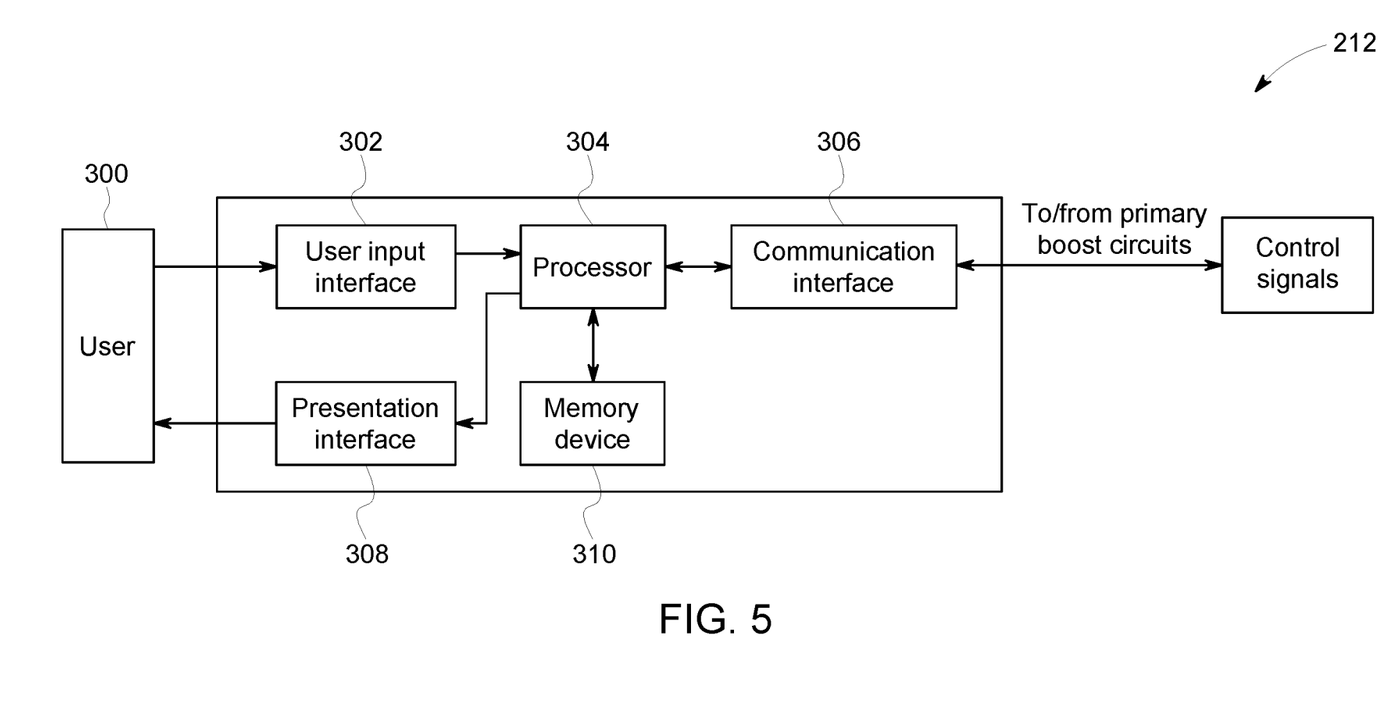
FIG. 5 is a block diagram of an exemplary controller that is used to operate the redundant boost circuit system shown in FIG. 2.

FIG. 5 is a block diagram of controller 212 that may be used to operate redundant boost circuit system 116 (shown in FIG. 2). In the exemplary embodiment, controller 212 is any type of controller capable of controlling operation of redundant boost circuit system 116. As described herein, controller 212 executes operations to control the operation of redundant boost circuit system 116 based at least partially on instructions from human operators. Controller 212 is configured to monitor parameters of redundant boost circuit system 116 and operate redundant boost circuit system 116 based on the monitored parameters. For example, controller 212 is configured to generate at least one control signal to control an output voltage of redundant boost circuits 218. Controller 212 is also configured to determine if primary boost circuit 220 is operable and transmit the at least one control signal to one of primary boost circuit 220 and secondary boost circuit 222, wherein the at least one control signal is transmitted to secondary boost circuit 222 if primary boost circuit 220 is inoperable. In alternative embodiments, controller 212 may execute any operation that enables redundant boost circuit system 116 to function as described herein.

In the exemplary embodiment, controller 212 includes a memory device 310 and a processor 304 coupled to memory device 310. Processor 304 may include one or more processing units, such as, without limitation, a multi-core configuration. Processor 304 is any type of processor that permits controller 212 to operate as described herein. In some embodiments, executable instructions are stored in memory device 310. Controller 212 is configurable to perform one or more operations described herein by programming processor 304. For example, processor 304 may be programmed by encoding an operation as one or more executable instructions and providing the executable instructions in memory device 310. In the exemplary embodiment, memory device 310 is one or more devices that enable storage and retrieval of information such as executable instructions or other data. Memory device 310 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 310 may be configured to store any type of data, including, without limitation, operation parameters associated with redundant boost circuit system 116. In some embodiments, processor 304 removes or "purges" data from memory device 310 based on the age of the data. For example, processor 304 may overwrite previously recorded and stored data associated with a subsequent time or event. In addition, or alternatively, processor 304 may remove data that exceeds a predetermined time interval. In addition, memory device 310 includes, without limitation, sufficient data, algorithms, and commands to facilitate monitoring parameters of redundant boost circuit system 116.

In some embodiments, controller 212 includes a presentation interface 308 coupled to processor 304. Presentation interface 308 presents information, such as the operating conditions of radio system 100, to a user 300. In one embodiment, presentation interface 308 includes a display adapter (not shown) coupled to a display device (not shown), such as a cathode ray tube (CRT), a liquid crystal display (LCD), an organic LED (OLED) display, or an "electronic ink" display. In some embodiments, presentation interface 308 includes one or more display devices. In addition, or alternatively, presentation interface 308 includes an audio output device (not shown), for example, without limitation, an audio adapter or a speaker (not shown).

In some embodiments, controller 212 includes a user input interface 302. In the exemplary embodiment, user input interface 302 is coupled to processor 304 and receives input from user 300. User input interface 302 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 308 and user input interface 302.

In the exemplary embodiment, a communication interface 306 is coupled to processor 304 and is configured to be coupled in communication with one or more other devices, such as RRU 130, and to perform input and output operations with respect to such devices while performing as an input channel. For example, communication interface 306 may include, without limitation, a wired network adapter, a wireless network adapter, a mobile telecommunications adapter, a serial communication adapter, or a parallel communication adapter. Communication interface 306 may receive a data signal from or transmit a data signal to one or more remote devices. For example, in some embodiments, communication interface 306 of controller 212 may transmit/receive a data signal to/from boost circuit compensator modules 216 and/or translator board 214.

Presentation interface 308 and communication interface 306 are both capable of providing information suitable for use with the methods described herein, such as, providing information to user 300 or processor 304. Accordingly, presentation interface 308 and communication interface 306 may be referred to as output devices. Similarly, user input interface 302 and communication interface 306 are capable of receiving information suitable for use with the methods described herein and may be referred to as input devices.

Figure 6:
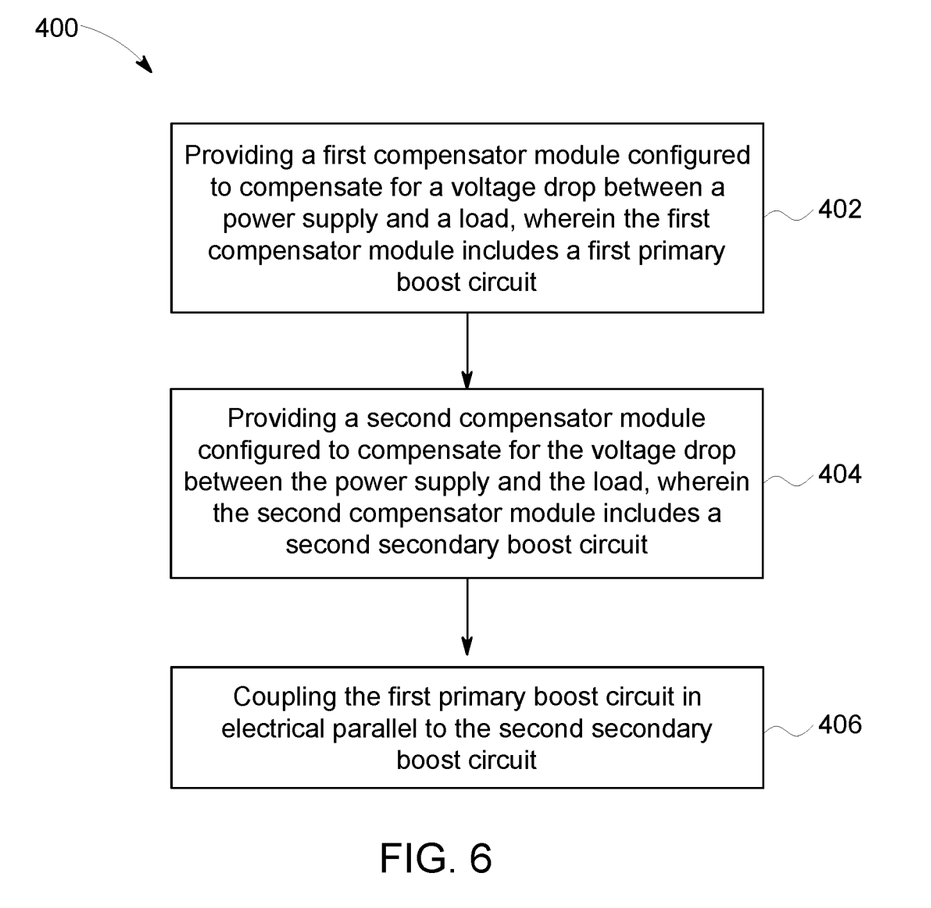
FIG. 6 is a flow chart illustrating a method of assembling a redundant boost circuit.

FIG. 6 is a flow chart illustrating a method 400 of assembling a redundant boost circuit 218. Referring to FIGS. 1-5, method 400 includes providing 402 a first compensator module 224 configured to compensate for a voltage drop between a power supply 102 and a load 130, wherein the first compensator module 224 includes a first primary boost circuit 220. Method 400 also includes providing 404 a second compensator module 226 configured to compensate for the voltage drop between the utility source 102 and the load 130, wherein the second compensator module 226 includes a second secondary boost circuit 222. Method 400 further includes coupling 406 the first primary boost circuit 220 in electrical parallel to the second secondary boost circuit 222.

The above-described redundant boost circuit systems facilitate improving the reliability of a boost circuit system configured to compensate for line voltage drop between a power supply and a load using a redundant boost circuit system. Specifically, the redundant boost circuit system includes a redundant boost circuit and a controller. The redundant boost circuit includes a first compensator module including a primary boost circuit and a second compensator module including a secondary boost circuit. The secondary boost circuit and the primary boost circuit are configured to compensate for a voltage drop between a power supply and a load. The controller is configured to generate at least one control signal to control an output voltage of the redundant boost circuit, to determine if the primary boost circuit is operable, and to transmit the at least one control signal to one of the primary boost circuit and the secondary boost circuit, wherein the at least one control signal is transmitted to the secondary boost circuit if the primary boost circuit is inoperable. The load is carried by the primary circuit during normal operation and is shifted to the secondary circuit if the first circuit requires maintenance or experiences a failure, either in the first component or the primary circuit itself. Such a configuration facilitates reducing operational downtime and increasing boost circuit system reliability, promoting superior performance, reduced operational costs, and more efficient maintenance of the boost circuit system.

An exemplary technical effect of the methods, systems, and apparatus described herein includes at least one of: (a) reducing operational downtime due to scheduled maintenance; (b) reducing the cost of operating a boost circuit system; (c) improving reliability of a boost circuit system; and (d) reducing unplanned service outages due to boost circuit system failures.

Exemplary embodiments of a redundant boost circuit system including a controller are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with components as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A redundant boost circuit configured to compensate for a voltage drop between a power supply and a plurality of loads, said redundant boost circuit comprising:
   a first compensator module comprising:
      a first primary boost circuit; and
      a first secondary boost circuit; and
   a second compensator module comprising:
      a second primary boost circuit; and
      a second secondary boost circuit, wherein said first primary boost circuit and said second secondary boost circuit are electrically coupleable between the power supply and a first load, wherein said second primary boost circuit and said first secondary boost circuit are electrically coupleable between the power supply and a second load, and wherein said first and second compensator modules are communicatively coupled such that said second secondary boost circuit activates in the event that said first primary boost circuit is inoperable.

2. The redundant boost circuit in accordance with claim 1, wherein said first secondary boost circuit is active when said first secondary boost circuit is operable, and wherein said second primary boost circuit activates in the event that said first secondary boost circuit is inoperable.

3. The redundant boost circuit in accordance with claim 1, wherein at least one of said first compensator module and said second compensator module is configured to:
   determine whether said first primary boost circuit is operable; and
   control an output voltage of at least one of said first primary boost circuit and said second secondary boost circuit based on the determination of whether said first primary boost circuit is operable.

4. The redundant boost circuit in accordance with claim 3, wherein at least one of said first compensator module and said second compensator module is further configured to receive i) a first status signal from said first primary boost circuit indicating an operational status of said first primary boost circuit and ii) a second status signal from said second secondary boost circuit indicating an operational status of said second secondary boost circuit.

5. The redundant boost circuit in accordance with claim 4, wherein at least one of said first compensator module and said second compensator module is further configured to determine that said first primary boost circuit is inoperable when no status signal is received from said first primary boost circuit.

6. The redundant boost circuit in accordance with claim 4, wherein the first and second status signals are one of periodic and continuous.

7. The redundant boost circuit in accordance with claim 1, further comprising a plurality of voltage sensors electrically coupleable between said first and second compensator modules and said first and second loads.

8. The redundant boost circuit in accordance with claim 1, wherein the first load and the second load are remote radio units.

9. A line voltage drop compensation system comprising:
   a power supply;
   a first load;
   a second load;
   a redundant boost circuit configured to compensate for a voltage drop between said power supply and said first and second loads, said redundant boost circuit comprising:
      a first compensator module comprising:
         a first primary boost circuit; and
         a first secondary boost circuit; and
      a second compensator module comprising:
         a second primary boost circuit; and
         a second secondary boost circuit,
      wherein said first primary boost circuit and said second secondary boost circuit are electrically coupled between the power supply and the first load, wherein said second primary boost circuit and said first secondary boost circuit are electrically coupled between the power supply and the second load, and wherein said first and second compensator modules are communicatively coupled such that said second secondary boost circuit activates in the event that said first primary boost circuit is inoperable.

10. The line voltage drop compensation system of claim 9, wherein said first secondary boost circuit is active when said first secondary boost circuit is operable, and wherein said second primary boost circuit activates in the event that said first secondary boost circuit is inoperable.

11. The line voltage drop compensation system of claim 9, wherein at least one of said first compensator module and said second compensator module is further configured to:
    determine whether said first primary boost circuit is operable; and
    control an output voltage of at least one of said first primary boost circuit and said second secondary boost circuit based on the determination of whether said first primary boost circuit is operable.

12. The line voltage drop compensation system of claim 11, wherein at least one of said first compensator module and said second compensator module is further configured to receive i) a first status signal from said first primary boost circuit indicating an operational status of said first primary boost circuit and ii) a second status signal from said second secondary boost circuit indicating an operational status of said second secondary boost circuit.

13. The line voltage drop compensation system of claim 12, wherein at least one of said first compensator module and said second compensator module is further configured to determine that said first primary boost circuit is inoperable when no status signal is received from said first primary boost circuit.

14. The line voltage drop compensation system of claim 12, wherein the first and second status signals are one of periodic and continuous.

15. The line voltage drop compensation system of claim 9, further comprising a plurality of voltage sensors electrically coupled between said first and second compensator modules and said first and second loads.

16. The line voltage drop compensation system of claim 9, wherein said first load and said second load are remote radio units.

17. A method of assembling a redundant boost circuit for compensating for a voltage drop between a power supply and a plurality of loads, said method comprising:
   electrically coupling a first primary boost circuit of a first compensator module in parallel with a second secondary boost circuit of a second compensator module; and
   electrically coupling a first secondary boost circuit of the first compensator module in parallel with a second primary boost circuit of the second compensator module.

18. The method in accordance with claim 17, further comprising:
   determining whether the first primary boost circuit is operable; and
   controlling an output voltage of one of the first primary boost circuit and the second secondary boost circuit based on the determination of whether the first primary boost circuit is operable.

19. The method in accordance with claim 18, further comprising receiving, with at at least one of the first compensator module and the second compensator module, i) a first status signal from the first primary boost circuit indicating an operational status of the first primary boost circuit and ii) a second status signal from the second secondary boost circuit indicating an operational status of the second secondary boost circuit.

20. The method in accordance with claim 18, further comprising electrically coupling the first primary boost circuit and the second secondary boost circuit between the power supply and a first load.

* * * * *